US011389769B2

(12) United States Patent
Chen et al.

(10) Patent No.: US 11,389,769 B2
(45) Date of Patent: Jul. 19, 2022

(54) POROUS CERAMIC FILTERS AND METHODS FOR MAKING THE SAME

(71) Applicant: Corning Incorporated, Corning, NY (US)

(72) Inventors: Guohua Chen, Painted Post, NY (US); Curtis Robert Fekety, Corning, NY (US); Jianguo Wang, Horseheads, NY (US); Huiqing Wu, Shanghai (CN)

(73) Assignee: Corning Incorported, Corning, NY (US)

( * ) Notice: Subject to any disclaimer, the term of this patent is extended or adjusted under 35 U.S.C. 154(b) by 406 days.

(21) Appl. No.: 15/771,878

(22) PCT Filed: Oct. 28, 2016

(86) PCT No.: PCT/US2016/059287
§ 371 (c)(1),
(2) Date: Apr. 27, 2018

(87) PCT Pub. No.: WO2017/075328
PCT Pub. Date: May 4, 2017

(65) Prior Publication Data
US 2018/0311621 A1 Nov. 1, 2018

Related U.S. Application Data

(60) Provisional application No. 62/248,690, filed on Oct. 30, 2015.

(51) Int. Cl.
*B01D 53/22* (2006.01)
*B01D 63/06* (2006.01)
(Continued)

(52) U.S. Cl.
CPC ....... *B01D 63/066* (2013.01); *B01D 46/0001* (2013.01); *B01D 46/2429* (2013.01);
(Continued)

(58) Field of Classification Search
CPC .............. B01D 46/543; B01D 2325/02; B01D 71/027; B01D 46/2429; B01D 63/066;
(Continued)

(56) References Cited

U.S. PATENT DOCUMENTS 5,258,164 A 11/1993 Bloom et al.
5,298,046 A 3/1994 Peisert
(Continued)

FOREIGN PATENT DOCUMENTS

CN 1671458 A 9/2005
CN 101080261 A 11/2007
(Continued)

OTHER PUBLICATIONS

International Search Report and Written Opinion of the International Searching Authority; PCT/US2016/059287; dated Feb. 8, 2017; 11 Pages; European Patent Office.
(Continued)

*Primary Examiner* — Anthony R Shumate
(74) *Attorney, Agent, or Firm* — Joseph M. Homa

(57) ABSTRACT

Disclosed herein are filtration articles comprising a porous ceramic structure comprising a plurality of channels separated by a plurality of porous interior walls, and a nanomembrane disposed on at least a portion of a surface of the porous ceramic structure, wherein the nanomembrane comprises nanoparticles of at least one inorganic oxide, and wherein the nanoparticles are present in a concentration ranging from about 0.001 g/L to about 1 g/L based on the total volume of the porous ceramic structure. Methods for making such filtration articles and methods for filtering a particulate from a fluid using such filtration articles are also disclosed herein.

22 Claims, 5 Drawing Sheets

(51) Int. Cl.
  *B01D 46/00* (2022.01)
  *B01D 67/00* (2006.01)
  *B01D 46/24* (2006.01)
  *B01D 71/02* (2006.01)
  *B01D 46/54* (2006.01)
  *B01D 69/02* (2006.01)
(52) U.S. Cl.
  CPC ....... *B01D 46/543* (2013.01); *B01D 67/0072* (2013.01); *B01D 69/02* (2013.01); *B01D 71/025* (2013.01); *B01D 71/027* (2013.01); *B01D 46/24491* (2021.08); *B01D 46/24492* (2021.08); *B01D 2325/02* (2013.01)
(58) Field of Classification Search
  CPC .... B01D 2046/2437; B01D 2046/2433; B01D 46/0001; B01D 69/02; B01D 71/025; B01D 67/0072
  See application file for complete search history.

(56) References Cited

U.S. PATENT DOCUMENTS

| | | | |
|---|---|---|---|
| 5,415,775 | A | 5/1995 | Castillon et al. |
| 9,943,785 | B2* | 4/2018 | Jeong ................. C02F 1/68 |
| 10,155,674 | B1* | 12/2018 | Stewart .............. B01D 69/145 |
| 2001/0013220 | A1 | 8/2001 | Schonauer |
| 2001/0051108 | A1 | 12/2001 | Schonauer |
| 2005/0207946 | A1 | 9/2005 | Asano et al. |
| 2007/0187029 | A1* | 8/2007 | Axtell ................. B01J 20/20 156/297 |
| 2008/0299349 | A1 | 12/2008 | Gu et al. |
| 2008/0299377 | A1 | 12/2008 | Gu et al. |
| 2009/0025610 | A1* | 1/2009 | Kimura .............. C09D 183/04 106/287.14 |
| 2010/0043408 | A1 | 2/2010 | Girot et al. |
| 2010/0056369 | A1 | 3/2010 | Gu |
| 2010/0221557 | A1* | 9/2010 | Higuchi .................. C08J 7/04 428/447 |
| 2010/0266461 | A1 | 10/2010 | Sappok et al. |
| 2011/0156727 | A1 | 6/2011 | Achhammer et al. |
| 2012/0132584 | A1 | 5/2012 | Fekety et al. |
| 2013/0133313 | A1 | 5/2013 | Harris |
| 2013/0149458 | A1 | 6/2013 | Cai et al. |
| 2015/0235721 | A1* | 8/2015 | Grandjean ......... B01D 67/0093 210/650 |
| 2015/0343387 | A1* | 12/2015 | Kim ..................... B01D 71/42 210/500.25 |
| 2016/0045874 | A1* | 2/2016 | Deng .................. B01D 69/148 210/500.23 |
| 2017/0335730 | A1 | 11/2017 | Keppeler et al. |
| 2018/0052091 | A1 | 2/2018 | Zhang |
| 2018/0243717 | A1* | 8/2018 | Macedo Tavares ..... B01J 13/16 |
| 2018/0311621 | A1* | 11/2018 | Chen ................... B01D 71/025 |
| 2018/0318795 | A1* | 11/2018 | Yu ........................ B01J 35/1014 |
| 2019/0126186 | A1 | 5/2019 | Beall et al. |
| 2019/0374896 | A1 | 12/2019 | Beall et al. |
| 2020/0123958 | A1 | 4/2020 | Schwarzmann et al. |
| 2020/0131972 | A1 | 4/2020 | Herberger |

FOREIGN PATENT DOCUMENTS

| | | |
|---|---|---|
| CN | 101128655 A | 2/2008 |
| CN | 103080046 A | 5/2013 |
| CN | 103339088 A | 10/2013 |
| CN | 104755149 A | 7/2015 |
| EP | 1408207 A1 | 4/2004 |
| JP | 2005-296935 A | 10/2005 |
| JP | 2010095399 A | 4/2010 |
| JP | 2010156206 A | 7/2010 |
| JP | 2010-527747 A | 8/2010 |
| WO | 2006034717 A1 | 4/2006 |
| WO | 2017075328 A1 | 5/2017 |
| WO | 2020/101913 A1 | 5/2020 |

OTHER PUBLICATIONS

Andersen et al. "The formation of porous membranes by filtration of aerosol nanoparticles," Journal of Nanoparticle Research 4 (2002), pp. 405-416.

Chinese Patent Application No. 201680064025.5; English Translation of the First Office Action dated Dec. 16, 2019; China Patent Office; 10 Pgs.

Tandon et al., "Measurement and prediction of filtration efficiency evolution of soot loaded diesel particulate filters," 65 Chemical Engineering Science 4751-60 (2010.

International Search Report and Written Opinion of the International Searching Authority; PCT/US2018/058525; dated Jan. 30, 2019; 16 Pages; European Patent Office.

English Translation of JP2018521565 Office Action dated Mar. 27, 2019, Japan Patent Office, 3 Pgs.

* cited by examiner

POROUS CERAMIC FILTERS AND METHODS FOR MAKING THE SAME

CROSS-REFERENCE TO RELATED APPLICATIONS

This application is a national stage application under 35 U.S.C. § 371 of International Patent Application Serial No. PCT/US2016/059287, filed on Oct. 28, 2016, which claims the benefit of priority of U.S. Provisional Application Ser. No. 62/248,690 filed on Oct. 30, 2015 the contents of each are relied upon and incorporated herein by reference in their entireties.

FIELD OF THE DISCLOSURE

The disclosure relates generally to honeycomb structures, such as porous ceramic filters, and more particularly to porous ceramic honeycomb structures, or honeycombs, comprising nanomembranes, as well as methods for making such porous ceramic structures, and methods for filtering particulates from a fluid using such filter structures.

BACKGROUND

Air purification and filtration may be important under a number of circumstances, for example, in hospitals, laboratories, operation theaters, medical facilities, clean rooms, automobiles, aircraft, residences, and the like

SUMMARY

The disclosure relates, in various embodiments, to filtration articles comprising a porous ceramic structure, or "substrate", such as a porous ceramic honeycomb structure comprising a plurality of porous interior walls defining and separating a plurality of channels; and a nanomembrane disposed on at least a portion of a surface of the porous ceramic substrate, wherein the nanomembrane comprises nanoparticles of at least one inorganic oxide, and wherein the nanoparticles are present in a concentration ranging from about 0.001 g/L to about 1 g/L based on the total volume of the porous ceramic substrate structure. According to various embodiments, the at least one inorganic oxide may be chosen from $SiO_2$, $Al_2O_3$, $SnO_2$, $ZnO$, $TiO_2$, and combinations thereof. A porosity of the nanomembrane may, in certain embodiments, be greater than about 80%. According to further embodiments, the porous ceramic structure or substrate may have a median pore size ranging from about 5 microns to about 20 microns. In still further embodiments, the nanomembrane may have a thickness of about 20 microns or less. According to yet further embodiments, the porous ceramic structure or substrate may have a filtration efficiency greater than about 99% and/or a pressure drop of about 500 Pa or less. According to various embodiments, a plurality of channels can be blocked or sealed or plugged at or near the end of a channel, or within a channel.

Methods for filtering particulates from a fluid are also disclosed, the methods comprising flowing the fluid through a filtration article disclosed herein. Further disclosed herein are methods of making such filtration articles, the methods comprising depositing a nanomembrane on at least a portion of a surface of a porous ceramic structure or substrate, wherein the porous ceramic structure or substrate comprises a plurality of channels separated by a plurality of porous interior walls, wherein the nanomembrane comprises nanoparticles of at least on inorganic oxide, and wherein the nanoparticles are present in a concentration ranging from about 0.001 g/L to about 1 g/L based on the total volume of the porous ceramic structure or substrate. In various embodiments, depositing the nanomembrane may comprise combusting at least one inorganic oxide precursor in the presence of at least one oxidizing agent to produce inorganic oxide nanoparticles; and flowing a fluid stream comprising the inorganic oxide nanoparticles through the porous ceramic structure or substrate for a deposition time sufficient to form a nanomembrane on at least a portion of the surface of the porous ceramic structure or substrate. According to various embodiments, the inorganic oxide precursor may be the in form of a solution comprising at least one solvent. Deposition process variables may, in non-limiting embodiments, include nanoparticle flow rates ranging from about 10 mg/min to about 200 mg/min, deposition times ranging from about 5 seconds to about 5 minutes, and/or deposition temperatures ranging from about 50° C. to about 1200° C.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and, together with the description, serve to explain the principles and operations of the disclosure.

BRIEF DESCRIPTION OF THE DRAWINGS

The following detailed description can be further understood when read in conjunction with the following drawings in which, where possible, like numerals are used to refer to like elements, and.

DETAILED DESCRIPTION

Filtration Articles

Disclosed herein are filtration articles comprising a porous ceramic structure or substrate comprising a plurality of channels separated by a plurality of porous interior walls;

and a nanomembrane disposed on at least a portion of a surface of the porous ceramic structure or substrate, wherein the nanomembrane comprises nanoparticles of at least one inorganic oxide, and wherein the nanoparticles are present in a concentration ranging from about 0.001 g/L to about 1 g/L based on the total volume of the porous ceramic structure or substrate.

Figure 1:
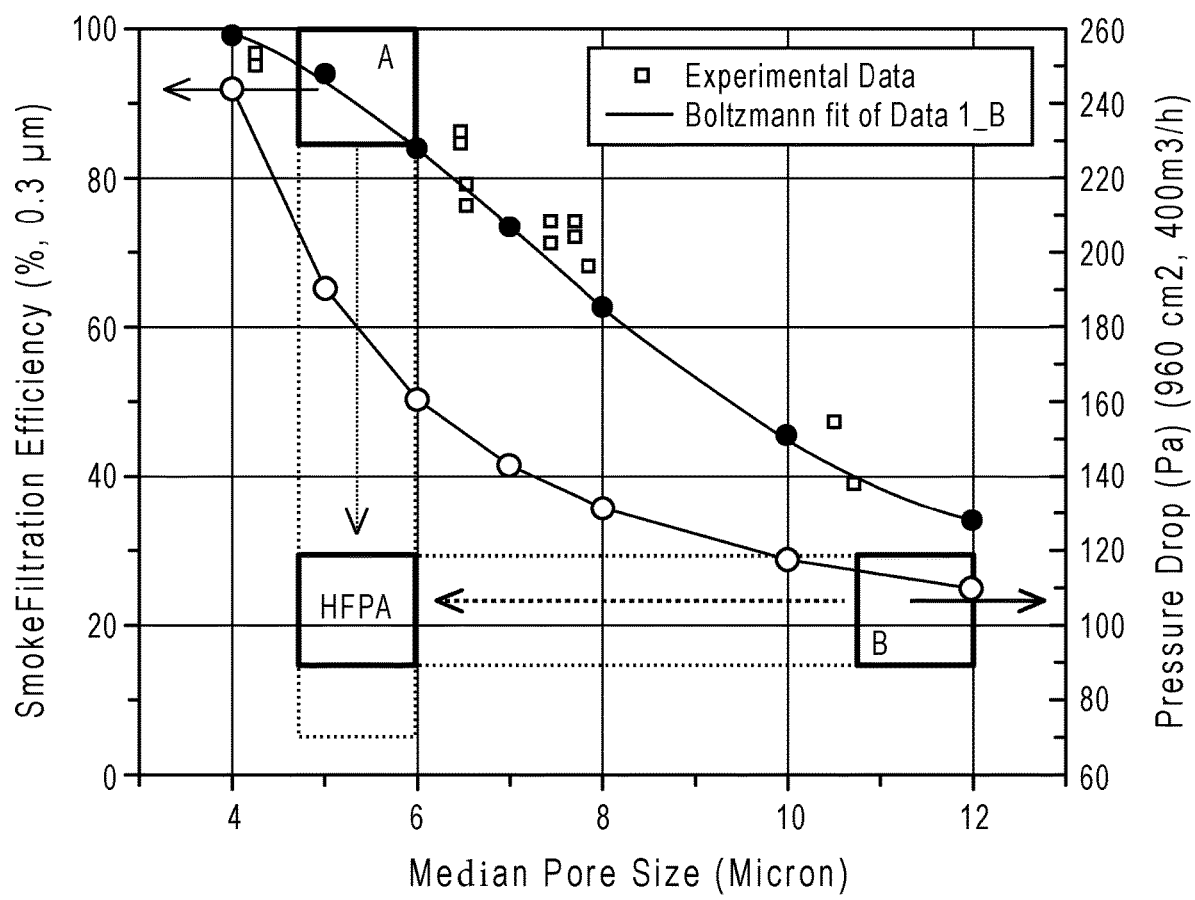
FIG. 1 is a graphical plot illustrating pressure drop and filtration efficiency as a function of median pore size for a bare ceramic honeycomb filter.

FIG. 1 is a graphical plot illustrating pressure drop and filtration efficiency as a function of median pore size for a bare ceramic honeycomb filter (200/8, 65% porosity) not comprising a nanomembrane. As can be appreciated from the plot, filtration efficiency can be increased by decreasing the median pore size of the filter. However, decreasing median pore size to improve air filtration efficiency also results in an increase in pressure drop (region A). Similarly, increasing the median pore size to reduce pressure drop results in a decrease in filtration efficiency (region B).

Pressure drop for the bare filter can be estimated by the exponential decay function (1):

$$\Delta P_s = A_1 * \exp(-d_{50}/K_1) + P_0 \qquad (1)$$

where $A_1$, $K_1$, and $P_0$ are structure parameters related to porosity, cell geometry, web thickness, flow surface area, and flame deposition conditions of the nanomembrane, and $d_{50}$ is the median pore size of the filter. In contrast, the filtration efficiency of the filter follows a Boltzmann distribution, as shown on the plot in FIG. 1. Thus, achieving a minimal requirement of initial air filtration efficiency (85%) and pressure drop (120 Pa) has, to date, been difficult, if not impossible. Porous ceramic structures or substrates treated with a nanomembrane as disclosed herein may provide a solution to this problem.

As used herein, the term "nanomembrane" is intended to refer to a film, coating, or layer formed by the aggregation of nanoparticles having at least one dimension less than about 100 nm. For example, a nanomembrane can comprise inorganic oxide nanoparticles, or a mixture of two or more inorganic oxide nanoparticles which may, for instance, have an average particle size or diameter of less than 100 nm. Of course, it is to be understood that the nanomembrane is not limited to those comprising spherical nanoparticles and any particle shape is envisioned as falling within the scope of the disclosure. The terms "film," "layer," and "coating" are used interchangeably herein to refer to a nanomembrane formed on a surface by the nanoparticles. The term "surface" is used herein to refer to any exterior or interior surface of a ceramic structure or substrate including, but not limited to, any surfaces formed by pores and/or channels on both the external structure or substrate wall and the interior structure or substrate microstructure.

According to various embodiments, the nanomembrane may comprise nanoparticles of at least one inorganic oxide. For example, the nanomembrane may comprise a mixture of inorganic oxide nanoparticles. Suitable nanoparticles may comprise, in non-limiting embodiments, $SiO_2$, $Al_2O_3$, $TiO_2$, ZnO, $SnO_2$, and like oxides, as well as combinations thereof, without limitation. The nanoparticles may, in certain embodiments, have at least one dimension of about 100 nm or less, such as less than about 90 nm, less than about 80 nm, less than about 70 nm, less than about 60 nm, less than about 50 nm, less than about 40 nm, less than about 30 nm, less than about 20 nm, less than about 10 nm, or less than about 5 nm, e.g., ranging from about 1 nm to about 100 nm. The nanoparticles may have any regular or irregular shape, such as spheroid, ovoid, platelet, and other shapes. The at least one dimension may thus correspond to a particle size, diameter, length, width, height, or any other suitable dimension.

In non-limiting embodiments, the nanomembrane may have a thickness of about 20 microns or less, such as ranging from about 10 nm to about 10 microns, from about 20 nm to about 5 microns, from about 30 nm to about 2 microns, from about 40 nm to about 1 micron, from about 50 nm to about 500 nm, from about 60 nm to about 400 nm, from about 70 nm to about 300 nm, from about 80 nm to about 200 nm, from about 90 nm to about 150 nm, or from about 100 nm to about 120 nm, including all ranges and subranges therebetween. The porosity of the nanomembrane may, in various embodiments, be greater than or equal to about 80%, such as greater than about 85%, 86%, 87%, 88%, 89%, 90%, 91%, 92%, 93%, 94%, 95%, or greater.

A "porous" ceramic structure or substrate as disclosed herein includes a ceramic structure or substrate having a porosity of at least about 40%, such as about 45%, 50%, 55%, 60%, 65%, 70%, 75%, 80%, 85%, or greater. The porous ceramic structure or substrate is not limited in shape, size, pore size, pore distribution, and/or pore number. For example, the porous ceramic structure or substrate can have any desired 3-dimensional shape, such as a cube, block, pyramid, cylinder, sphere, or the like, with any suitable width, length, height, and/or diameter. In various embodiments, the porous ceramic structure or substrate may be formed as a monolithic structure, for example, via extruding and/or molding techniques. Those having ordinary skill in the art are familiar with the various techniques for forming such ceramic monolithic structures.

The porous ceramic structures or substrates can also have any variety of configurations and designs including, but not limited to, flow-through monolith, wall-flow monolith, or partial-flow monolith structures. Exemplary flow-through monoliths or substrates include a structure comprising channels, porous networks, or other passages through which fluid can flow from one end of the structure to the other. Exemplary wall-flow monolith include, for example, a monolithic structure comprising channels or porous networks or other passages which may be open or plugged at opposite ends of the structure, thereby directing fluid flow through the channel walls as it flows from one end of the structure to the other. Exemplary partial-flow monoliths can include any combination of a wall-flow monolith with a flow-through monolith, e.g., having some channels or passages open on both ends to permit the fluid to flow through the channel without blockage.

Figure 2A:
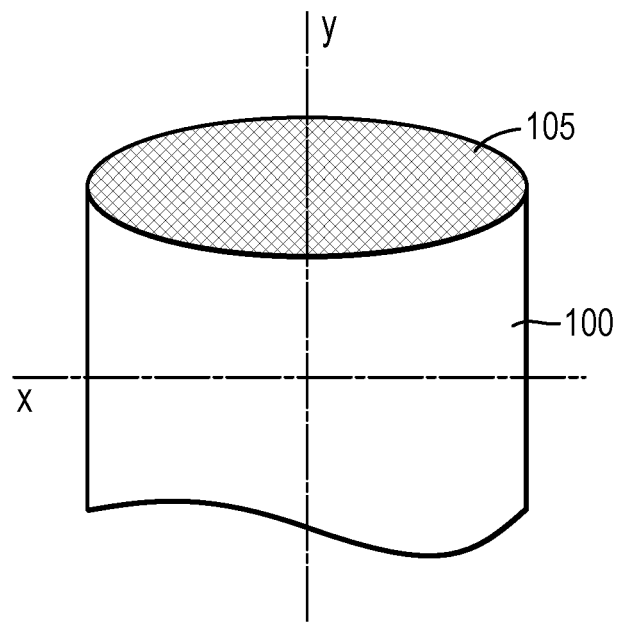
FIGS. 2A-B illustrate exemplary porous ceramic honeycomb structures or substrates.
Figure 2B:
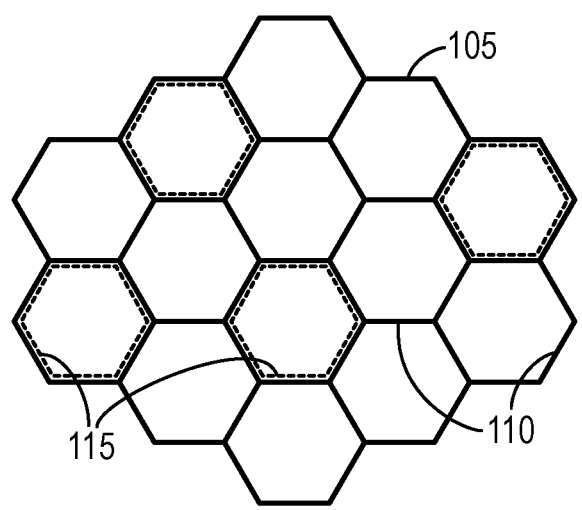

In certain embodiments, the porous ceramic structure or substrate can have a honeycomb shape, e.g., a structure such as a monolith or other construction comprising a plurality of intersecting walls that define parallel channels or cells. The cellular geometry of the honeycomb configuration can be used for filtration due to its high surface area per unit volume for increased deposition of particulate matter. Such a honeycomb structure or substrate 100 comprising a plurality of channels 105 is illustrated in FIG. 2A. FIG. 2B illustrates a cross-sectional view of a portion of the honeycomb structure 100 of FIG. 2A taken along its x-axis. A plurality of interior walls 110 separate and define the channels 105. The nanomembrane 115 (indicated by dashed lines) may thus be formed on at least a portion of the surfaces of the interior channel walls (as illustrated) and/or the exterior surface of the honeycomb (not illustrated) and variations thereof.

The nanomembrane and honeycomb structure depicted in FIGS. 2A-B is exemplary only and is not to be construed as limiting in any manner on the appended claims. For example, while the honeycomb structure 100 is depicted with channels 105 having a substantially hexagonal cross-section (e.g., in a plane perpendicular to the y axis), the channels can have another geometry, for example, circular, square, triangular, rectangular, or sinusoidal cross-sections, or any combination thereof. Additionally, although the honeycomb structure 100 is depicted as substantially circularly cylindrical in shape, such shape is exemplary only and the porous ceramic structure or substrate can have another shape including, but not limited to, spherical, oblong, pyramidal, cubic, or block shapes. Furthermore, while the nanomembrane 115 is depicted as coating the interior walls 110 of specific channels 105, the nanomembrane can coat all of the channels in whole or in part, or any portion thereof, including exterior structure or substrate surfaces, without limitation.

Honeycomb filters are often described in terms of cells (or channels) per square inch of representative surface area, as well as interior wall thickness ($10^{-3}$ inches). Thus, a honeycomb structure comprising 300 cells/in$^2$ and a wall thickness of 0.008 inches would be labeled as a 300/8 honeycomb. Exemplary honeycombs may comprise from about 100 to about 500 cells/in$^2$ (15.5-77.5 cells/cm$^2$), such as from about 150 to about 400 cells/in$^2$ (23.25-62 cells/cm$^2$), or from about 200 to about 300 cells/in$^2$ (31-46.5 cells/cm$^2$), including all ranges and subranges therebetween. In some embodiments, the interior wall thickness can range from about 0.005 to about 0.02 inches (127-508 microns), such as from about 0.006 to about 0.015 inches (152-381 microns), from about 0.008 to about 0.01 inches (203-254 microns), e.g., about $5 \times 10^{-3}$, $6 \times 10^{-3}$, $7 \times 10^{-3}$, $8 \times 10^{-3}$, $9 \times 10^{-3}$, $10 \times 10^{-3}$, $12 \times 10^{-3}$, $14 \times 10^{-3}$, $16 \times 10^{-3}$, $18 \times 10^{-3}$, or $20 \times 10^{-3}$ inches, including all ranges and subranges therebetween. In various embodiments, honeycomb filter or structure lengths and/or diameters can range from one to several inches, such as from about 1 inch to about 12 inches (2.54-30.48 cm), from about 2 inches to about 11 inches (5.08-27.94 cm), from about 3 inches to about 10 inches (7.62-25.4 cm), from about 4 inches to about 9 inches (10.16-22.86 cm), from about 5 inches to about 8 inches (12.7-20.32 cm), or from about 6 inches to about 7 inches (15.24-17.78 cm), including all ranges and subranges therebetween.

The composition of the porous ceramic structure or substrate can be selected for use in a diesel particulate filter (DPF) or gasoline particulate filter (GPF). Exemplary materials include a porous ceramics including, but not limited to, cordierite, silicon carbide, silicon nitride, aluminum titanate, eucryptite, calcium aluminate, zirconium phosphate, spodumene, and the like. The filter or substrate can, in certain embodiments, comprise an outer skin forming an outer periphery, such as a porous outer surface of the filter. which surrounds interior walls to form a honeycomb structure with walls with a porous microstructure that define e.g., a plurality of channels. The the outer skin and interior walls can be made from the same material or different materials and, in some embodiments, the outer skin can have a thickness different than the interior wall thickness.

The porous ceramic structure or substrate can be adapted to have a flow-through, wall-flow, or partial-flow configuration. Wall-flow and partial-flow can be achieved, for instance, by plugging one or more passages (or channels) extending through the structure or substrate. For example, alternating channels may be blocked with plugs at opposite ends to promote fluid flow through the walls of the porous interior wall structure to form a wall-flow filter. Pressure build-up within end-blocked channels may force the fluid to pass through the porous wall(s) to a channel that is not blocked, such that particulate matter in the fluid is trapped by the walls while the fluid passes through unobstructed. Plugs may be made of a suitable material and may include, for example, a mixture of ceramic (e.g., cordierite, aluminum titanate, calcium aluminate, etc.) with binders, fillers, and/or solvents (e.g., fibers, silica sol, methyl cellulose, water, etc.).

According to certain non-limiting embodiments, the porous ceramic structure or substrate can have a median pore size ($d_{50}$) of less than about 20 microns, such as ranging from about 3 microns to about 20 microns, such as from about 5 microns to about 15 microns, or from about 8 microns to about 10 microns, including all ranges and subranges in between, e.g., about 3, 4, 5, 6, 7, 8, 9, 10, 11, 12, 13, 14, 15, 16, 17, 18, 19, or 20 microns. For instance, the median pore size of the porous ceramic substrate can range from about 6 microns to about 10 microns, such as from about 7 microns to about 9 microns, or 8 microns, including all ranges and subranges therebetween. Additionally, in some embodiments, it may be desirable to limit the number of larger pores in the ceramic substrate, e.g., such that pores greater than 20 microns make up less than about 10% of the total porosity ($d_{90}=20$ microns). For example, pores greater than 30 microns may make up less than about 8%, less than about 5%, or less than about 2% of the total porosity. Similarly, in some embodiments, it may be desirable to limit the number of smaller pores in the ceramic substrate, e.g., such that pores less than 3 microns make up less than about 10% of the total porosity ($d_{10}=3$ microns). For example, pores smaller than 3 microns may make up less than about 8%, less than about 5%, or less than about 2% of the total porosity.

As used herein, the terms "loaded," "coated," or "modified" substrate are used interchangeably to refer to a porous ceramic substrate upon which at least one nanomembrane has been loaded, coated, or otherwise deposited. As discussed in more detail with respect to FIGS. 7A-B, the nanomembrane may be deposited on the substrate such that it covers or partially covers at least a portion of the pores within the ceramic substrate. For example, the nanomembrane can cover the pores on the outer wall surface (e.g., pore "opening") or can extend into the ceramic substrate microstructure via one or more pore "necks." The nanomembrane can thus cover the pore opening(s) or line the pore channel(s), thereby providing highly porous surface area upon which particulates may be trapped during fluid flow through the filter. The nanomembrane may be deposited using a relatively low amount of material, for instance, less than about 1 gram of nanoparticles may be deposited per unit volume (L) of the porous ceramic substrate, such as less than about 500 mg/L, or less than about 250 mg/L, e.g., from about 1 mg/L to about 1000 mg/L, from about 10 mg/L to about 900 mg/L, from about 25 mg/L to about 800 mg/L, from about 50 mg/L to about 700 mg/L, from about 100 mg/L to about 600 mg/L, from about 200 mg/L to about 500 mg/L, or from about 300 mg/L to about 400 mg/L, including all ranges and subranges therebetween.

The filtration articles disclosed herein may be used to remove particulate matter from a fluid stream. For instance, fluid streams may comprise gases, vapors, or liquids, and the particulates may comprise a separate phase in the fluid, such as solid particulates in a gas or liquid stream, or droplets of liquid in a gas stream, and the like. Particulates can thus include soot, ash, dust, aerosolized liquids, and any other variety of particulate contaminant present in any given fluid.

For example, infectious diseases can be spread by the transfer of viruses and bacteria, not only by direct and indirect contact, but also through the air. Exhaust from moving vehicles is also a growing concern as environmental regulations become more stringent over time. Various air contaminants can be carried through the air by small particulates, for example, by dust particles or aerosolized droplets. These small particles may hang in the air and travel on air currents through ventilation systems over considerable distances. At present, industrial air purification may be carried out using High Efficiency Particulate Air (HEPA) or Ultra Low Penetration Air (ULPA) filters. HEPA filters may purify air up to 99.97%, whereas ULPA filters may purify air up to 99.997% (for 0.3 micron particle sizes).

Various commercially available HEPA and ULPA filters are composed of mats of randomly arranged fibers with pores having sizes ranging from 0.1-1 microns. The filtration mechanism for these filters may be a combination of interception, impaction, and diffusion, such that the particles remain trapped in the filtration matrix or web. The filtration mechanism thus renders the regeneration of traditional HEPA and ULPA filters impractical. As currently available filters should be replaced periodically, they are often constructed from disposable components having short life time and/or lower capacity. Also, air filtration using ceramic honeycomb filters has been attempted but typically do not provide air filtration efficiency sufficient to meet HEPA standards. Moreover, modification of those honeycombs to improve air filtration efficiency often results in increased pressure drop across the filter, which may be detrimental to filter performance. The filtration efficiency and/or pressure drop of ceramic honeycomb filters may be altered by loading the filter with ash cake, carbon soot cake, and/or free particles. However, due to the limitation of relatively low porosity (<70%) of particle packing and poor durability in those filters, as well as higher loading level of these particulates (1-10 g/L), such modified honeycomb filters may not have sufficient filtration efficiency, may have a large pressure drop, and/or may exhibit poor durability due to the deposit of damaging residues on the filter surface.

On the other hand, various embodiments of the filtration articles disclosed herein can provide for porous ceramic filters having sufficiently high filtration efficiency while also exhibiting a relatively low pressure drop; in some embodiments these articles can be regenerated, e.g., which need not be discarded and replaced periodically. Methods for making such filters are disclosed herein which can have reduced manufacturing cost, complexity, and/or time as well as reduced environmental impact.

The filtration efficiency of the filtration article can be measured by comparing the particle load of a fluid before and after the fluid passes through a filter. Filtration efficiency is discussed herein with respect to U.S. and European filtration standards for Efficiency Particulate Air (EPA) filters, High Efficiency Particulate Air (HEPA), and Ultra Low Penetration Air (ULPA) filters. Such standards measure the filtration efficiency for a particle size of 0.3 microns (see Table II below). According to various embodiments, the filtration articles disclosed herein may have a filtration efficiency (0.3 microns) of at least about 70%, such as at least about 75%, at least about 80%, at least about 85%, at least about 90%, at least about 95%, or at least about 99%, or greater, e.g., ranging from about 70% to about 99%. in some embodiments, the filtration efficiency may be greater than about 85% (E10), greater than about 95% (E11), greater than about 99.5% (E12), greater than about 99.95% (H13), greater than about 99.995% (H14), greater than about 99.9995% (U15), greater than about 99.99995% (U16), or greater than about 99.999995% (U17), including all ranges and subranges therebetween. The filtration articles disclosed herein may exhibit the above filtration efficiencies over a range of fluid flow rates, such as from about 100 L/min to about 2000 L/min, from about 250 L/min to about 1500 L/min, from about 500 L/min to about 1250 L/min, or from about 750 L/min to about 1000 L/min, including all ranges and subranges therebetween.

Filtration articles disclosed herein may provide improved filtration efficiency while also exhibiting a relatively low pressure drop "penalty" (e.g., the difference between the pressure drop of the bare filter and the pressure drop of the loaded filter). As used herein, the term "pressure drop" refers to the resulting pressure drop of a fluid as it flows through the ceramic substrate or filter, from the inlet end to the outlet end. Pressure drop measurements and values provided herein refer to the "initial" pressure drop of the filter, e.g., the first pass through the filter before it becomes loaded with particulates. It is understood that pressure drop across a filter naturally tends to increase as the filter becomes increasingly loaded with particulate matter. In some embodiments, the pressure drop of the filtration articles may be less than about 500 Pa, such as less than about 400 Pa, less than about 300 Pa, less than about 200 Pa, or less than about 100 Pa, e.g., ranging from about 100 Pa to about 500 Pa, including all ranges and subranges therebetween. According to additional embodiments, the pressure drop penalty of the loaded filter as compared to a bare filter (of similar composition and construction) may be less than about 200 Pa, such as less than about 150 Pa, less than about 100 Pa, less than about 75 Pa, less than about 50 Pa, or less than about 25 Pa, e.g., ranging from about 25 to about 200 Pa, including all ranges and subranges therebetween.

The filtration articles disclosed herein may have one or more additional advantages, such as increased surface area for collection of particulates as compared to traditional filters. This increased surface area may translate into a higher filtration capacity such that the filter may have a longer lifetime before regeneration. For example, the coated ceramic structures or substrates disclosed herein may have a lifetime that is about 3-4 times longer than that of a traditional HEPA filter. Additionally, as discussed in more detail with respect to Example 4, because the nanomembrane may be used to trap most, if not all, of the particulate matter, the filtration articles disclosed herein may be regenerated by washing the filters to remove the nanomembrane (and trapped particulates) and re-depositing a new nanomembrane on the porous ceramic structure or substrate, rather than discarding the entire filter once it reaches its filtration capacity.

Methods

Disclosed herein are methods for making a filtration article, the methods comprising depositing a nanomembrane on at least a portion of a surface of a porous ceramic structure or substrate, wherein the porous ceramic structure or substrate comprises a plurality of channels separated by a plurality of porous interior walls, wherein the nanomembrane comprises nanoparticles of at least one inorganic oxide, and wherein the nanoparticles are present in a concentration ranging from about 0.001 g/L to about 1 g/L based on the total volume of the porous ceramic structure or substrate. Further disclosed herein are methods for filtering particulates from a fluid, the methods comprising flowing the gas through a filtration article comprising a porous ceramic structure or substrate and a nanomembrane disposed on at least a portion of a surface of the porous ceramic structure or substrate, wherein the porous ceramic structure or substrate comprises a plurality of channels separated by a plurality of porous interior walls, wherein the nanomembrane comprises nanoparticles of at least one inorganic oxide, and wherein the nanoparticles are present in a concentration ranging from about 0.001 g/L to about 1 g/L based on the total volume of the porous ceramic structure or substrate.

According to various embodiments disclosed herein, deposition of the nanomembrane may be carried out using any suitable nanoparticle deposition method, such as flame deposition, pyrolysis, chemical vapor deposition (CVD), plasma enhanced CVD (PECVD), or any other form of CVD. Flame deposition can comprise, for example, combusting at least one inorganic oxide precursor in the presence of an oxidizing agent to produce inorganic oxide nanoparticles. A stream comprising the nanoparticles, e.g., an exhaust gas or vapor exiting a combustion chamber, can then be flowed through a bare porous ceramic structure or substrate such that the nanoparticles are deposited onto at least a portion of a surface of the structure or substrate.

Suitable inorganic oxide precursors can include any liquid, gas, or vapor component comprising a source component that can be oxidized to form the desired inorganic oxide. For example, in the case of zinc oxide (ZnO) nanoparticles, the precursor can include any component comprising Zn, such as dimethyl zinc, diethyl zinc, and zinc acetyl-acetonate, to name a few. Similarly, in the case of silica ($SiO_2$) nanoparticles, the precursor can be any component comprising Si, such as tetraethyl orthosilicate (TEOS), octamethylcyclotetrasiloxae (OMCTS), hexamethyldisiloxane (HMDSO), and the like. Similar precursors can be chosen to produce $Al_2O_3$ (e.g., aluminum tri-sec-butoxide), $TiO_2$ (e.g., titanium isopropoxide), $SnO_2$ (e.g., tin (IV) chloride), and other nanoparticles. It is within the ability of one skilled in the art to choose the appropriate type and amount of precursor for a given application.

In certain embodiments, the inorganic oxide precursor may be in the form of a solution, dispersion, or suspension comprising at least one precursor and at least one solvent. For example, the inorganic oxide precursor may be a solid dissolved or suspended in a solvent, or a liquid precursor may also be combined with a solvent to form a solution or dispersion. Suitable solvents can include, by way of non-limiting example, water, deionized water, alcohols, volatile hydrocarbons, and combinations thereof. For instance, solvents may include acetone, methanol, ethanol, propanol, ethylene glycol, dimethyl sulfoxide (DMSO), N,N-dimethylformamide (DMF), N-methyl-2-pyrrolidone (NMP), pyridine, tetrahydrofuran (THF), dichloromethane, xylene, hexane, and combinations thereof. The concentration of the precursor(s) in such solutions, dispersions, and/or suspensions can be varied depending, e.g., on the desired nanoparticle generation rate. In some non-limiting embodiments, the precursor concentration can range from about 1% to about 50% by weight, such as from about 2% to about 40%, from about 3% to about 30%, from about 4% to about 25%, from about 5% to about 20%, from about 6% to about 15%, from about 7% to about 10%, or from about 8% to about 9% by weight, including all ranges and subranges therebetween.

The at least one inorganic oxide precursor can be combusted in the presence of at least one oxidizing agent to convert the source component to an inorganic oxide. Oxidizing agents can include, for example, any liquid, gas, or vapor component comprising oxygen, such as air, $O_2$ gas, $H_2O$, $H_2O_2$, and the like. A combustion agent may also be included to assist with the vaporization and/or oxidation of the precursor(s). Suitable combustion agents can include flammable hydrocarbons and mixtures thereof, such as gas and natural gas. Exemplary hydrocarbons may include $C_1$-$C_{12}$ hydrocarbons such as methane, ethane, propane, butane, pentane, hexane, heptane, octane, decane, and the like, and mixtures comprising such hydrocarbons.

Combustion temperatures can vary depending on the precursor materials used, but in general may range from about 400° C. to about 2000° C., such as from about 500° C. to about 1800° C., from about 600° C. to about 1600° C., from about 800° C. to about 1400° C., or from about 1000° C. to about 1200° C., including all ranges and subranges therebetween. In some embodiments, the temperature may be chosen and/or varied to achieve a desired nanoparticle size and/or distribution. Deposition may take place at the combustion temperature, or at a different temperature, according to various embodiments. Exemplary deposition temperatures can range, for instance, from about 50° C. to about 1200° C., such as from about 100° C. to about 1100° C., from about 150° C. to about 1050° C., from about 200° C. to about 1000° C., from about 250° C. to about 900° C., from about 300° C. to about 800° C., from about 400° C. to about 700° C., or from about 500° C. to about 600° C., including all ranges and subranges therebetween. Deposition may take place at atmospheric pressure or, in various embodiments, may occur under a vacuum.

Precursor flow rates (or the rate at which the precursor is burned) may also vary depending on the precursor concentration as well as the desired nanoparticle generation rate and/or nanomembrane thickness. Exemplary precursor flow rates can range, in some embodiments, from about 1 mL/min to about 50 mL/min, such as from about 2 mL/min to about 40 mL/min, from about 3 mL/min to about 30 mL/min, from about 4 mL/min to about 25 mL/min, from about 5 mL/min to about 20 mL/min, from about 6 mL/min to about 15 mL/min, from about 7 mL/min to about 10 mL/min, or from about 8 mL/min to about 9 mL/min, including all ranges and subranges therebetween. Flow rates for the combustion and/or oxidizing agents can similarly be varied to achieve the desired reaction stoichiometry. Such flow rates can, in various embodiments, result in a nanoparticle generation rate ranging from about 10 mg/min to about 500 mg/min, such as from about 20 mg/min to about 400 mg/min, from about 30 mg/min to about 300 mg/min, from about 40 mg/min to about 200 mg/min, from about 50 mg/min to about 150 mg/min, or from about 75 mg/min to about 100 mg/min, including all ranges and subranges therebetween.

After nanoparticle generation, a stream comprising the nanoparticles, such as an exhaust gas or vapor, may be flowed through a porous ceramic structure or substrate to deposit the nanoparticles on at least one surface thereof. Because the nanoparticles tend to follow the path of least resistance from the inlet to the outlet of the porous structure or substrate, the natural fluid flow through the structure or substrate may provide for a more uniformly deposited nanomembrane. Alternatively or additionally, the nanoparticle flow and deposition may be monitored in-situ and the deposition process variables changed accordingly to provide the desired nanomembrane properties and/or uniformity. The methods disclosed herein may also advantageously have a high nanoparticle collection efficiency (e.g., >90%) such that the methods result in minimal pollution and/or material loss.

Deposition times may vary, for example, based on the desired nanomembrane properties such as filtration efficiency, membrane thickness, and/or pressure drop. Exemplary deposition times may range, in non-limiting embodiments, from several seconds to several minutes, such as from about 5 seconds to about 10 minutes, from about 15 seconds to about 8 minutes, from about 30 seconds to about 6 minutes, from 45 seconds to about 5 minutes, from about 60 seconds to about 3 minutes, or from about 90 seconds to about 2 minutes, including all ranges and subranges therebetween. Such deposition times can, in various embodiments, result in a soot load of less than about 1 g/L, such as less than about 500 mg/L, or less than about 250 mg/L, e.g., from about 1 mg/L to about 1000 mg/L, from about 10 mg/L to about 900 mg/L, from about 25 mg/L to about 800 mg/L, from about 50 mg/L to about 700 mg/L, from about 100 mg/L to about 600 mg/L, from about 200 mg/L to about 500 mg/L, or from about 300 mg/L to about 400 mg/L, including all ranges and subranges therebetween.

The deposition parameters disclosed herein can be combined and/or modified by those of ordinary skill in the art to achieve a filtration article having the desired filtration efficiency and/or pressure drop properties. The methods disclosed herein may thus offer a great range of flexibility for controlling the morphology of the nanomembrane structure based on process conditions such as precursor concentration, combustion temperature, deposition temperature gradient (e.g., heating or cooling one or more regions of the structure or substrate), constant or variable flow rates, and the like.

Unlike the bare ceramic structure or substrate, in which the ceramic microstructure alone may influence the filtration efficiency and pressure drop of the filter, the overall performance of the nanomembrane coated structure or substrate can be determined by both the ceramic microstructure of the structure or substrate and the nanomembrane microstructure. Thus, the filtration article may be tuned to achieve both a relatively high filtration efficiency and a relatively low pressure drop, unlike the bare filter (see, e.g., FIG. 1). For example, the pressure drop for the nanomembrane may be modeled using the following function (2):

$$\Delta P_n = K_2 (d_{50})^2 \tag{2}$$

The total system pressure drop for the coated structure or substrate can be modeled using the following function (3):

$$\Delta P = \Delta P_s + \Delta P_n = A_1 * \exp(-d_{50}/K_1) + P_0 + K_2(d50)^2 \tag{3}$$

where $A_1$, $K_1$, $K_2$, and $P_0$ are structure parameters related to porosity, cell geometry, web thickness, flow surface area, and flame deposition conditions of the nanomembrane, and $d_{50}$ is the median pore size of the structure or substrate.

Figure 3:
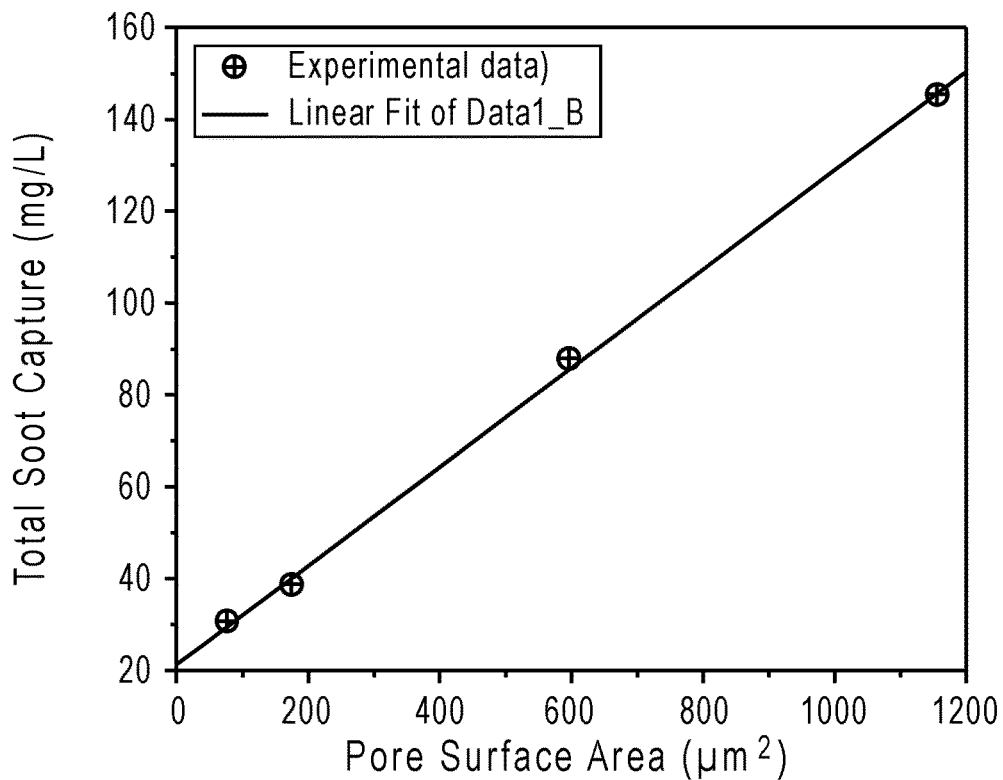
FIG. 3 is a graphical plot illustrating soot load as a function of the square of median pore size of a ceramic structure or substrate.
Figure 4:
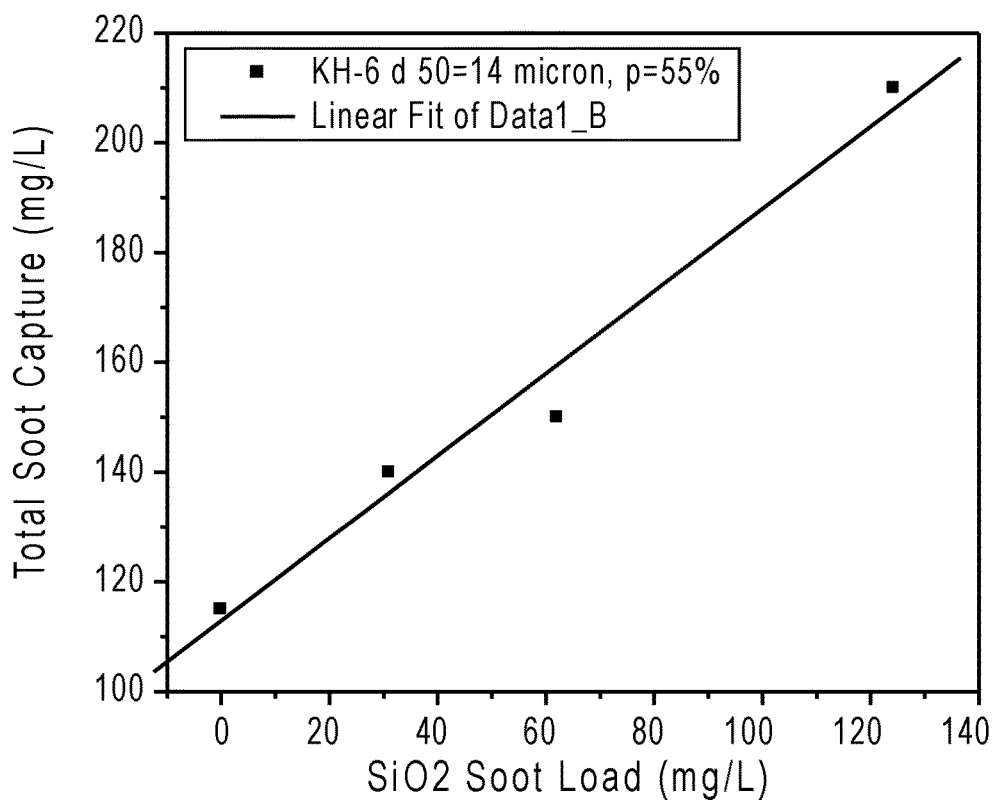
FIG. 4 is a graphical plot illustrating pressure drop as a function of soot load.

FIG. 3 is a plot illustrating that for high filtration efficiency (>99.9%) the soot load (mg/L) for a coated structure or substrate increases linearly as a function of the square of median pore size of the structure or substrate $(d_{50})^2$. FIG. 4 is a plot illustrating that pressure drop (Pa) also increases linearly as a function of soot load (mg/L) for a coated filter. Based on these correlations, it is believed that it may be advantageous to construct a coated filter by depositing a relatively thin nanomembrane on a ceramic structure or substrate with a relatively low median pore size.

Figure 5:
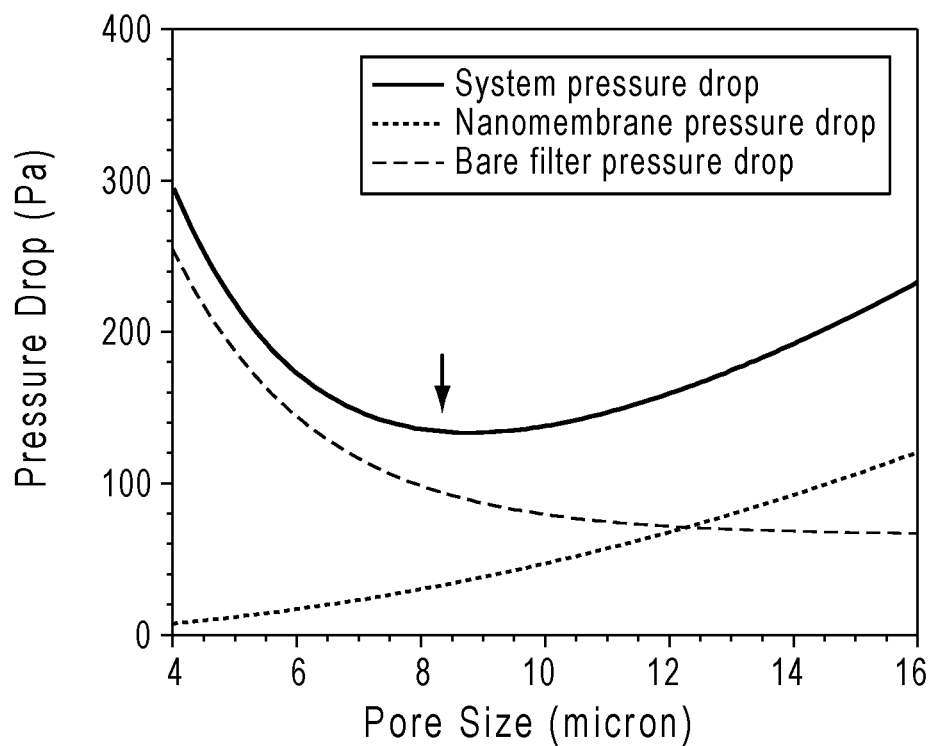
FIGS. 5-6 are graphical plots of overall system pressure drop, nanomembrane pressure drop, and ceramic structure or substrate pressure drop as a function of median pore size of a ceramic substrate.
Figure 6:
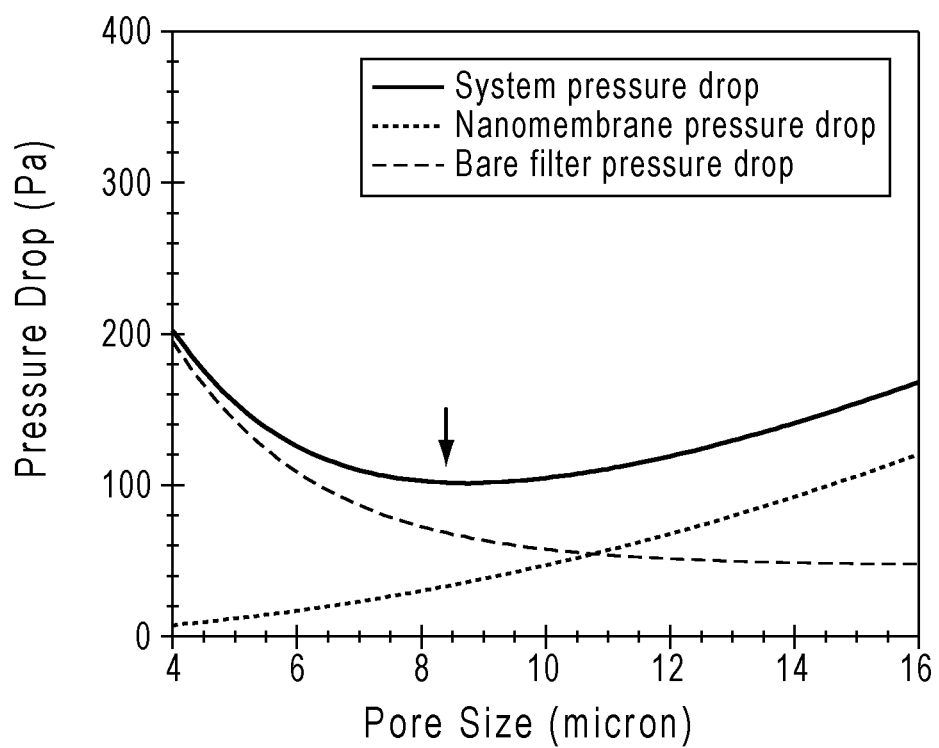

Using the above functions and relationships, it can be possible to determine advantageous microstructures which may result in a minimal pressure drop for the overall coated structure or substrate. For example, as shown in FIGS. 5-6, the overall system pressure drop function can be plotted by combining the individual nanostructure and bare filter functions, and the minimum of that curve (represented by the arrow) can be determined. In the case of the nanomembrane coated filter represented by FIG. 5 (400 m³/h flow rate, 960 cm² flow surface area, 65% porosity, 200/6, 4" length), a minimum pressure drop of about 140 Pa can be achieved using a median pore size of about 8-9 microns. Similarly, for the nanomembrane coated filter represented by FIG. 6 (400 m³/h flow rate, 960 cm² flow surface area, 65% porosity, 100/6, 6" length), a minimum pressure drop of about 100 Pa, which is lower than current HEPA filters on the market (~120 Pa) using a median pore size of about 8-9 microns.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a channel" includes examples having one such "channel" or two or more such "channels" unless the context clearly indicates otherwise. Similarly, a "plurality" or an "array" is intended to denote two or more, such that an "array of channels" or a "plurality of channels" denotes two or more such channels.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 100 nm" and "a dimension less than about 100 nm" both include embodiments of "a dimension less than about 100 nm" as well as "a dimension less than 100 nm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Example 1

Flame deposition of a nanomembrane comprising $SiO_2$ on MRP ceramic honeycomb filters (300/8, $d_{50}$=7.4 microns, 50% porosity, 2" diameter, 6" length) was carried out by combusting and oxidizing an inorganic oxide precursor in natural gas to generate nanoparticles. The nanomembrane was formed by flowing the exhaust vapor from the combustion chamber through the honeycomb filter to deposit nanoparticles on the filter surface. The inorganic oxide precursor was tetraethyl orthosilicate (TEOS) solution (10 wt % in ethanol) and was burned at a rate of 5 mL/min to give an $SiO_2$ nanoparticle generation rate of 144 mg/min. The combustion and oxidation of the TEOS precursor can be expressed by the following equation:

$$(CH_3CH_2O)_4Si + CH_4 + 8O_2 \rightarrow SiO_2 + 2CO_2 + 12H_2O$$

The deposition time ($t_D$) was varied from 30-300 seconds to produce filters with varying soot loads. Weight gain of the honeycomb filter was measured by subtracting the bare filter weight ($W_B$) from the filter weight after deposition ($W_D$) and this value was used to estimate the nanomembrane weight ($W_N$) and the soot load (g/L) on the filter. Filtration efficiency ($E_F$, 0.3 micron particles) and pressure drop ($\Delta P$, Pa) were measured and compared for the loaded filters and for a bare filter ($t_D$=0 s) at two different air (smoke) flow rates (113 L/min, 208 L/min). The results of these tests are shown in Table I below. For reference, the U.S. and European standards for HEPA and ULPA filters are provided in Table II.

As can be seen from Table I, whereas the bare filter failed to meet even the minimum filtration requirement for EPA filters (>85%), the filters comprising nanomembranes all exhibited an improved filtration efficiency meeting HEPA, and even ULPA, filtration standards. Moreover, each filter comprising a nanomembrane exhibited a total weight gain of less than 400 mg/L, indicating a relatively low silica soot load. Finally, the pressure drop increase or "penalty" as compared to a bare filter ranged from 80 to 200 Pa as a function of deposition time.

Figure 7A:
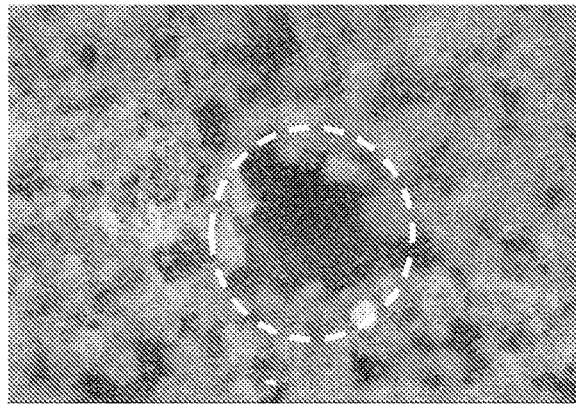
FIGS. 7A-D are scanning electron microscope (SEM) images of porous ceramic structures or substrates comprising a nanomembrane according to various embodiments of the disclosure.
Figure 7B:
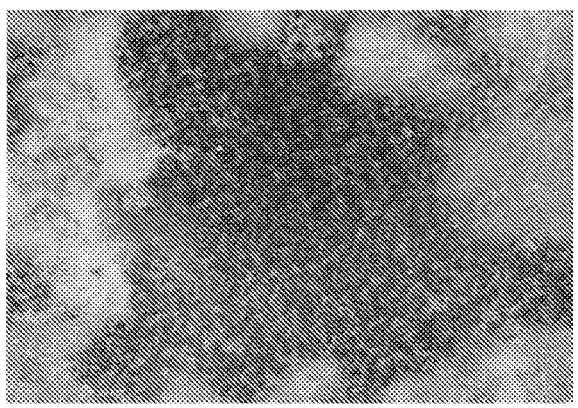
Figure 7C:
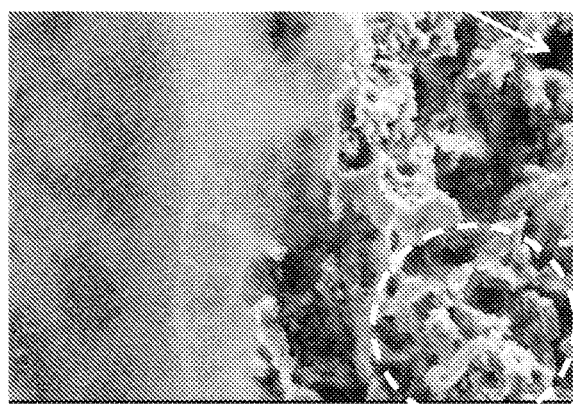
Figure 7D:
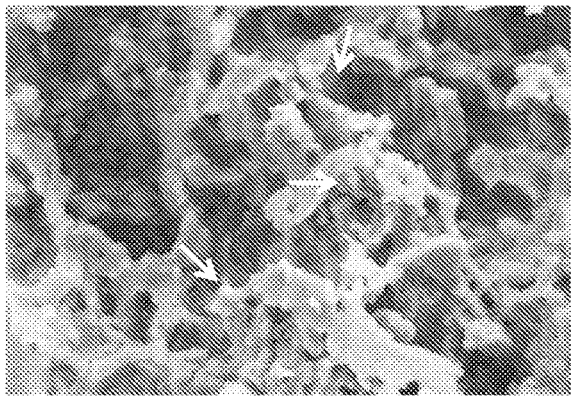

FIGS. 7A-D are SEM images of a ceramic honeycomb comprising an $SiO_2$ nanomembrane deposited using a flame deposition process disclosed herein. As can be seen in FIG. 7A, which is a topical view of a coated surface of the honeycomb, and FIG. 7B, which is an enlarged image of the circled portion of FIG. 7A, the nanomembrane can cover the pores openings at the wall surface. Additionally, as shown in FIG. 7C, which is a cross-sectional view of the honeycomb filter, and FIG. 7D, which is an enlarged image of the circled portion of FIG. 7C, the nanomembrane can also extend into the pores and deep into the honeycomb walls. The arrow in FIG. 7C points to a region in which the nanomembrane has not extended, whereas the arrows in FIG. 7D illustrate $SiO_2$ nanoparticles forming a nanomembrane on the pore walls.

TABLE I

Soot Load, Filtration Efficiency, and Pressure Drop for Honeycomb Filters

| $t_D$ (sec) | $W_B$ (g) | $W_D$ (g) | $W_N$ (g) (g/L) | $E_F$ (208 L/min) | $\Delta P$ (208 L/min) | $E_F$ (113 L/min) | $\Delta P$ (113 L/min) |
|---|---|---|---|---|---|---|---|
| 300 | 121.5464 | 121.6667 | 0.1203 0.3922 | 99.985 (H13) | 440 | 99.989 (H13) | 310 |
| 150 | 121.1400 | 121.1705 | 0.1145 0.3733 | 99.996 (H14) | 420 | 99.998 (U15) | 290 |
| 60 | 121.3005 | 121.4150 | 0.0588 0.1917 | 99.955 (H13) | 420 | 99.981 (H14) | 290 |
| 60 | 119.9952 | 120.0540 | 0.0305 0.09945 | 99.964 (H13) | 360 | 99.963 (H13) | 260 |
| 30 | 124.6050 | 124.6285 | 0.0235 0.07662 | 99.986 (H13) | 320 | 99.966 (H13) | 230 |
| 0 | | | | 70-71 (<E10) | 240 | 72-73 (<E10) | 170 |

TABLE II

US (EPA) and European Standards for Air Filtration

| Europe | Retention (total) | Retention (local) | USA (EPA) |
|---|---|---|---|
| E10 | >85% | — | EPA Filters |
| E11 | >95% | — | |
| E12 | >99.5% | — | |
| H13 | >99.95% | >99.75% | HEPA Filters |
| H14 | >99.995% | >99.975% | |

TABLE II-continued

US (EPA) and European Standards for Air Filtration

| Europe | Retention (total) | Retention (local) | USA (EPA) |
|---|---|---|---|
| U15 | >99.9995% | >99.9975% | ULPA Filters |
| U16 | >99.99995% | >99.99975% | |
| U17 | >99.999995% | >99.999975% | |

Example 2

Flame deposition of a nanomembrane comprising $SiO_2$ on MEE ceramic honeycomb filters (300/8, $d_{50}$=10.7 microns, 50% porosity, 2" diameter, 6" length) was carried out using the same flame deposition process outlined in Example 1 to evaluate the effect of ceramic microstructure on filtration efficiency. The deposition time ($t_D$) was varied from 7.5-60 seconds to produce filters with varying soot loads. Filtration efficiency ($E_F$, 0.3 micron particles) and pressure drop ($\Delta P$, Pa) were measured and compared for the loaded filters and for a bare filter ($t_D$=0 s) at an air (smoke) flow rate of 208 L/min. The results of these tests are shown in Table III below.

TABLE III

Filtration Efficiency and Pressure Drop for Honeycomb Filters

| $t_D$ (sec) | $E_F$ (208 L/min) | $\Delta P$ (208 L/min) |
|---|---|---|
| 60 | 99.1937 (E12) | 350 |
| 30 | 99.2593 (E12) | 330 |
| 15 | 97.3548 (E11) | 260 |
| 7.5 | 93.2183 (E10) | 230 |
| 0 | 31 (<E10) | 190 |

As shown in Table III, at a deposition time of 60 seconds, the filtration efficiency of the coated filter can reach 99+% but still does not quite meet the true HEPA standard. Without wishing to be bound by theory, it is believed that ceramic structures or substrates comprising larger median pore sizes may benefit from longer deposition times to deposit more nanoparticles so as to produce nanomembranes achieving higher filtration efficiencies.

Example 3

A scaled-up experiment was conducted using gasoline particulate filter (GPF) to show the general feasibility of applying a nanomembrane to a GPF to improve its filtration efficiency. Flame deposition of a nanomembrane comprising $SiO_2$ on KHL (200/8, $d_{50}$=14 microns, 55% porosity, 5.66" diameter, 4.5" length) ceramic honeycomb filters was carried out using a TEOS solution as the inorganic oxide precursor (2 wt % in ethanol) and a combustion rate of 10 mL/min to give an $SiO_2$ nanoparticle generation rate of 57.6 mg/min. The deposition time ($t_D$) was varied from 60-240 seconds to produce filters with varying soot loads. Weight gain of the honeycomb filter was measured and used to estimate the soot load ($W_N$, mg/L) on the filter. Filtration efficiency ($E_F$, 0.3 micron particles) and pressure drop ($\Delta P$, Pa) were measured and compared for the loaded filters and for a bare filter ($t_D$=0 s) at two different air (smoke) flow rates (1250 L/min, 800 L/min). The results of these tests are shown in Table IV below. Table IV demonstrates the general feasibility of using an inorganic oxide nanomembrane to improve the filtration efficiency of a GPF using minimal materials (<200 mg/L) and relatively low process times. Of course, the filtration efficiency of the filter can be further improved by changing one or more process variables, such as deposition time, precursor concentration, etc.

TABLE IV

Soot Load, Filtration Efficiency, and Pressure Drop for GPFs

| $t_D$ (sec) | $W_N$ (mg/L) | $E_F$ (1250 L/min) | $\Delta P$ (1250 L/min) | $E_F$ (800 L/min) | $\Delta P$ (800 L/min) |
|---|---|---|---|---|---|
| 240 | 124.2 | 98.7 | 210 | 99.1 | 120 |
| 120 | 62.1 | 83.1 | 150 | 82.2 | 90 |
| 60 | 31.1 | 70.5 | 140 | 68.0 | 80 |
| 0 | | 35 | 115 | 31 | 65 |

Example 4

The stability of deposited nanomembranes was evaluated by measuring the filtration efficiency and pressure drop of the filters before and after exposure to thermal, mechanical, and environmental stresses. Flame deposition of a nanomembrane comprising $SiO_2$ on MRP ceramic honeycomb filters (300/8, $d_{50}$=10.7 microns, 50% porosity, 2" diameter, 6" length) was carried out using the same flame deposition process outlined in Example 1 with deposition times varied from 90-180 seconds. Filtration efficiency ($E_F$, 0.3 micron particles) and pressure drop ($\Delta P$, Pa) were measured and compared for the loaded filters before and after exposure to heat, water, and air flow. The results of these tests are shown in Table V below.

TABLE V

Durability of Honeycomb Filters Comprising Nanomembranes

| $t_D$ (sec)/ Treatment | $W_B$ (g) | $W_D$ (g) | $W_N$ (g) (g/L) | $E_F$ (208 L/min) | $\Delta P$ (208 L/min) | $E_F$ (113 L/min) | $\Delta P$ (113 L/min) |
|---|---|---|---|---|---|---|---|
| 180 | 121.1400 | 121.1705 | 0.1145 0.3733 | 99.996 (H14) | 420 | 99.998 (U15) | 290 |
| Heat | | | | 99.981 (H14) | 420 | 99.975 (H14) | 280 |
| 60 | 121.3005 | 121.4150 | 0.0588 0.1917 | 99.955 (H13) | 420 | 99.981 (H14) | 290 |
| Water | | | | 73.38 (<E10) | 240 | 74.16 (<E10) | 170 |
| 30 | 124.6050 | 124.6285 | 0.0235 0.07662 | 99.986 (H13) | 320 | 99.966 (H13) | 230 |
| Air | | | | 99.941 (H13) | | 99.974 (H13) | |
| 0 | | | | 70-71 (<E10) | 240 | 72-73 (<E10) | 170 |

As shown in Table IV, after exposure to a thermal cycle (heated to 800° C. at a ramp rate of 100° C./h and held at 800° C. for one hour), the filter exhibited little to no change in terms of filtration efficiency and pressure drop, indicating that the filter has excellent thermal stability and can be reliably used in high temperature applications. After exposure to air flow (20 kPa back flush for 3 minutes), the filter exhibited little to no change in filtration efficiency, indicating that the filter also has excellent mechanical stability. Finally, after exposure to water (3 L/min back flush followed by drying at 100° C.), the filter exhibited filtration efficiency and pressure drop values similar to that of the bare filter ($t_D$=0 sec), indicating that the nanomembrane was successfully washed away. It is thus believed that the filters disclosed herein can be effectively regenerated by washing the nanomembrane (and captured particulates) from the honeycomb and redepositing a new nanomembrane, rather than discarding the entire filter after it reaches capacity.

What is claimed is:

1. A filtration article comprising:
 a porous ceramic structure comprising a plurality of channels separated by a plurality of porous interior walls, wherein alternating channels are blocked with plugs at opposite ends to promote fluid flow through the walls of the porous interior wall structure; and
 a nanomembrane disposed on at least a portion of a wall surface of the porous interior walls of the porous ceramic structure, wherein the nanomembrane comprises nanoparticles of at least one inorganic oxide, and wherein the nanoparticles are present in a concentration ranging from about 0.001 g/L to about 1 g/L based on the total volume of the porous ceramic structure;
 wherein the nanomembrane covers pore openings at the wall surface; and
 wherein the nanomembrane extends into the porous interior walls.

2. The filtration article of claim 1, wherein the porous ceramic structure is a ceramic honeycomb.

3. The filtration article of claim 1, wherein the nanomembrane is disposed on at least a portion of a porous interior wall surface of the porous ceramic structure.

4. The filtration article of claim 1, wherein the at least one inorganic oxide is selected from $SiO_2$, $Al_2O_3$, $SnO_2$, $ZnO$, $TiO_2$, or combinations thereof.

5. The filtration article of claim 1, wherein the nanomembrane has a porosity of about 85% or greater.

6. The filtration article of claim 1, wherein the porous ceramic structure has a median pore size ranging from about 3 microns to about 20 microns.

7. The filtration article of claim 1, wherein the porous ceramic structure has a median pore size ranging from about 6 microns to about 10 microns.

8. The filtration article of claim 1, wherein a thickness of the nanomembrane ranges from about 10 nm to about 20 microns.

9. The filtration article of claim 1, wherein the nanoparticles have an average particle size ranging from about 1 nm to about 100 nm.

10. The filtration article of claim 1, wherein a filtration efficiency of the filtration article is about 85% or greater for particulates having a particle size of about 0.3 microns at a fluid flow rate through the filtration article ranging from about 100 L/min to about 1500 L/min.

11. The filtration article of claim 1, wherein a pressure drop of the filtration article ranges from about 100 Pa to about 500 Pa or less at a fluid flow rate through the filtration article ranging from about 100 L/min to about 1500 L/min.

12. The filtration article of claim 1 wherein the porous ceramic structure has a porosity of about 40% or greater and a median pore size ranging from about 5 microns to about 20 microns.

13. A filtration article comprising:
 a porous ceramic substrate comprising porous interior walls comprising wall surfaces with pores; and
 nanoparticles disposed on at least a portion of a surface of the porous ceramic substrate, wherein the nanoparticles are comprised of at least one inorganic oxide, and wherein the nanoparticles are present in a concentration ranging from about 0.001 g/L to about 1 g/L based on the total volume of the porous ceramic substrate;
 wherein the nanoparticles cover the pores at the wall surfaces; and
 wherein the nanoparticles extend into the porous interior walls.

14. The filtration article of claim 13 wherein the porous ceramic substrate comprises a honeycomb structure.

15. The filtration article of claim 13 wherein the honeycomb structure comprises a plurality of porous walls defining a plurality of channels.

16. The filtration article of claim 13 wherein the at least one inorganic oxide is selected from SiO2, Al2O3, SnO2, ZnO, TiO2, or combinations thereof.

17. The filtration article of claim 13 wherein the at least one inorganic oxide comprises Al2O3.

18. The filtration article of claim 13 wherein the porous ceramic substrate has a median pore size ranging from about 3 microns to about 20 microns.

19. The filtration article of claim 13 wherein the porous ceramic substrate has a median pore size ranging from about 6 microns to about 10 microns.

20. The filtration article of claim 13 wherein the nanoparticles have an average particle size ranging from about 1 nm to about 100 nm.

21. The filtration article of claim 13 wherein the nanoparticles are present as a nanomembrane having a porosity of about 85% or greater.

22. The filtration article of claim 21 wherein a thickness of the nanomembrane ranges from about 10 nm to about 20 microns.

* * * * *